UNITED STATES PATENT OFFICE.

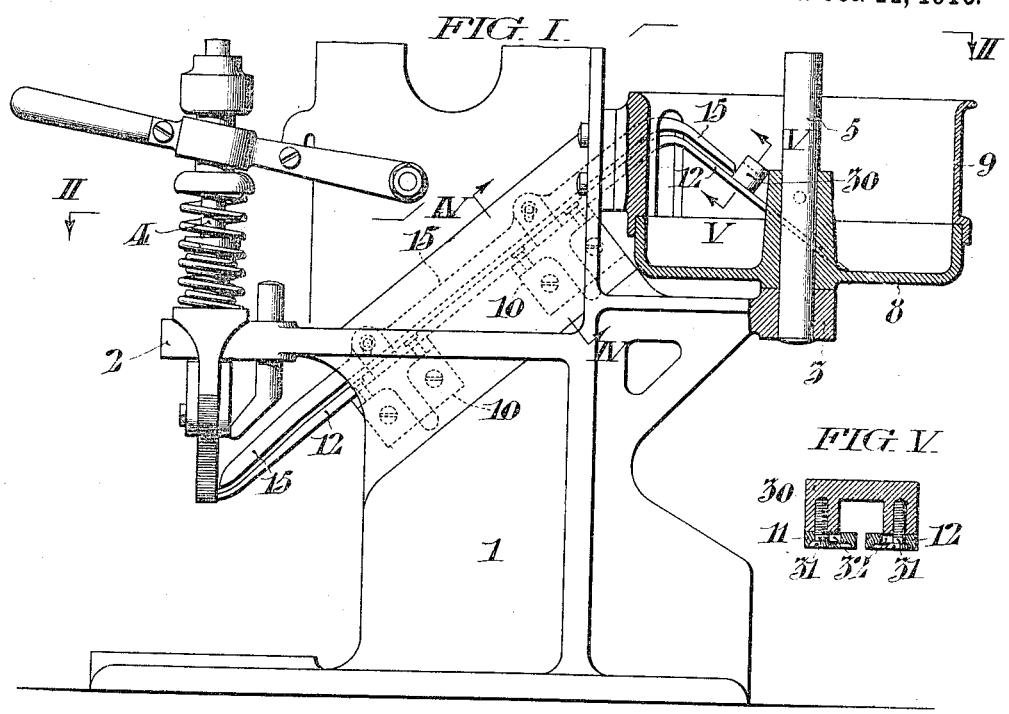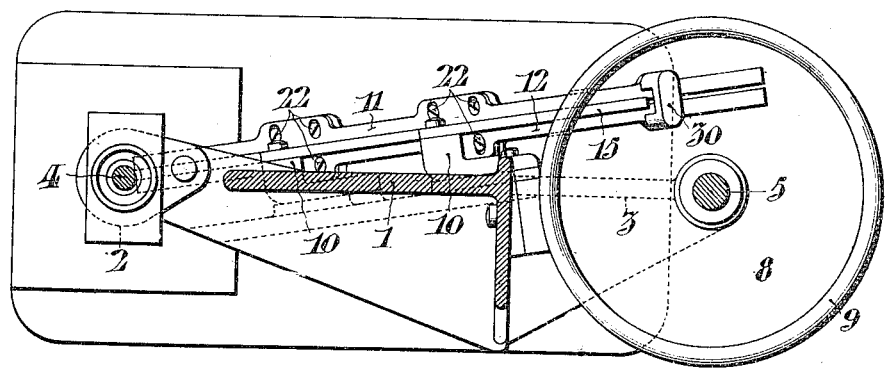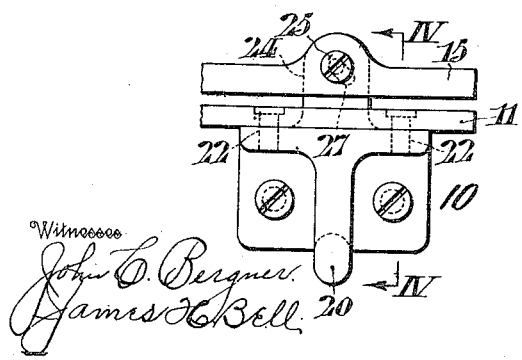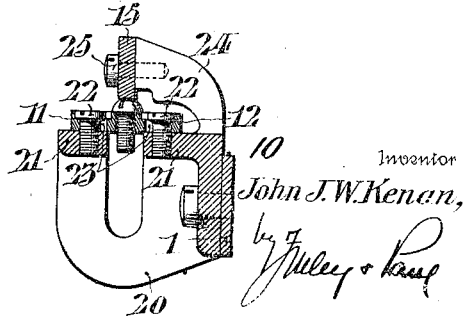

JOHN J. W. KENAN, OF PHILADELPHIA, PENNSYLVANIA, ASSIGNOR TO THOMAS W. JENKINS, OF PHILADELPHIA, PENNSYLVANIA.

FEED-CHUTE.

972,454. Specification of Letters Patent. Patented Oct. 11, 1910.

Original application filed April 9, 1908, Serial No. 425,978. Divided and this application filed October 30, 1909. Serial No. 525,481.

To all whom it may concern:

Be it known that I, JOHN J. W. KENAN, of Philadelphia, in the county of Philadelphia and State of Pennsylvania, have invented certain new and useful Improvements in Feed-Chutes, whereof the following is a specification, reference being had to the accompanying drawings.

My invention relates to feed chutes and the accompanying mechanism employed for the purpose of continuously feeding headed metal objects, as for instance, screws, tacks, bolts, and the like.

I have illustrated and will describe my mechanism as applied to a screw driving machine of the character shown in United States Letters Patent No. 944,561, granted under date of December 28th, 1909, upon an application filed by me under date of April 9th, 1908, Serial No. 425,978, of which this is a division. In such mechanism the feed chute is associated with a rotary hopper at one end, and screw driving mechanism at the other end of the chute, the relation of the parts being such that the screws are continuously fed by the chute from the rotary hopper to the point where they are delivered in position to be engaged by the screw driving mechanism.

My invention relates more particularly to the form and correlation of the plates of which the chute is composed; and the supporting parts upon which the component parts of the chute are adjustably mounted.

In the accompanying drawings, Figure I, represents a portion of the side elevation of a screw driving machine of the character above referred to, having a feed chute embodying my present invention applied to it. Fig. II, is an irregular plan section of the same along the line II, II, of Fig. I. Fig. III, is an elevation of one of the brackets employed for the support of the feed chute. Fig. IV, is a section along the line IV, IV, of Figs. I, and III. Fig. V, is a sectional view indicated at V, V, in Fig. I.

The machine constructed according to my invention comprises a standard 1, supporting brackets 2, and 3, which constitute bearings for the vertical shafts 4, and 5, respectively. These shafts may be rotated by any suitable mechanism such as described in the application above referred to, and description thereof has therefore been omitted from the drawings.

The screw driving mechanism is carried by the shaft 4, and is fully explained in the patent above referred to, and forms no part of the present invention, and need not be here again described.

To the lower end of shaft 5, is secured the rotating bottom 8, of the hopper 9, which is secured to the standard 1.

The feed chute is attached to the main standard 1, of the machine by means of brackets 10, 10, and in an angular direction in order that the chute may deliver by gravity.

The chute is formed of three parallel metal strips. Of these the two strips 11, and 12, form a raceway, being mounted in the same plane, with an intervening space, forming the feed slot between them. The third strip 15, is a guard strip mounted parallel with strips 11, and 12, and at right angles to their plane in such a way that the lower edge of the strip overlies and guards the raceway of the chute.

The raceway is in the form of an inverted V, with a curved apex and with arms of unequal length. The apex of the V, is situated at or near the point where the chute passes out of the hopper, the short arm being within and extending to the bottom of the hopper, while the long arm runs down to the point of delivery. The guard strip 15, is coincident with the entire long arm of the chute and passes over its apex, and also extends over a portion of the short arm.

The brackets 10, upon which the parts of the chute are mounted are of special construction, as shown in Figs. III, and IV. Each bracket consists of a bifurcated arm 20, surmounted by facing plates 21, the crotch between the bifurcations being of sufficient size to permit the passage of the object being fed along the chute. Against the facing plates 21, the main strips 11, and 12, which form the raceway are fastened by screws 22, passing through slots 23, which permit of the requisite adjustment of the strips to or from each other, whereby the raceway is capable of being made to fit different sizes of objects to be fed therethrough. The bracket is further provided with an upper arm 24, at the end of which the guard plate 15, is attached by screws 25, passing through slots 27, which are preferably inclined as shown in Fig. III, so as to secure vertical adjustment, notwithstanding the inclined position of the chute. By means of this adjustment, the guard may be made to accurately reject an object wrongly fed thereto, but to guide therein an object rightly seated in the raceway.

In order to prevent any spreading of the raceway within the hopper, I bridge the strips 11, and 12, with a spacing block 30. The said strips are secured to the block 30, by means of screws 31, which pass through slots 32, thus permitting the adjustment of the raceway at this region.

In operation a number of screws, are placed in the hopper and the rotation of the bottom of the hopper throws these against the end of the raceway which extends down within the hopper. The impetus with which these objects are thrown against the chute causes those of them which enter it in proper position, to seat themselves therein and travel up the short arm, and over the top of the V, whence gravity carries them down to the point where they engage the screw driving apparatus.

Having thus described my invention, I claim:—

1. A feed chute for headed objects formed by the combination of a pair of parallel strips bent in the form of an inverted V, with a rounded apex, and spaced to form a raceway; a rotating hopper within which descends one arm of the V; and a guard and guide strip parallel to the raceway, and passing over the rounded apex, and part way down into the hopper, whereby wrongly seated objects are rejected from the raceway before they reach the apex, and rightly seated objects prevented from leaving the raceway at the apex.

2. A feed chute for headed objects formed of three parallel strips, two of which are in the same lateral plane with an intervening slot to form a race-way, while the third, constituting a guard strip, is in a plane at right angles thereto, overhanging said slot; all three of said strips being bent in the form of an inverted V, with a rounded apex; all three of said strips being held in position by screws passing through slots in the strips, of which slots those in the race-way strips are at right angles to the race-way, while those in the guard strip are diagonally disposed to permit simultaneous and equal adjustment of both arms of the V shaped guard strip, whereby adjustment of all of said parts with reference to each other, may be effected to vary the size of the chute to the requirements of different sized objects.

3. In a feed chute for headed objects, the combination of three strips, two in the same plane with an intervening slot to form a raceway, and the other at right angles with its edge overhanging said slot; and supporting brackets for the chute with a bifurcated arm to which are attached the strips which form the raceway, and an overhanging arm to which the other strip is attached.

4. A feed chute for headed objects formed by the combination of a pair of parallel strips spaced to form a raceway; a rotating hopper within which descends one extremity of the raceway; a guard strip overhanging the raceway; and a spacing block, adjustably secured to the parallel strips, bridging the raceway near its end within the hopper.

In testimony whereof, I have hereunto signed my name, at Philadelphia, Pennsylvania, this eighteen day of October 1909.

JOHN J. W. KENAN.

Witnesses:
JAMES H. BELL,
E. L. FULLERTON.